United States Patent [19]

von Bonin

[11] 4,369,064

[45] Jan. 18, 1983

[54] NON-INFLAMMABLE FOAMABLE MOLDING COMPOSITIONS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 189,009

[22] Filed: Sep. 22, 1980

[30] Foreign Application Priority Data

Sep. 26, 1979 [DE] Fed. Rep. of Germany ....... 2938874

[51] Int. Cl.³ .............................................. C09D 5/18
[52] U.S. Cl. ............................ 106/18.15; 106/18.18; 106/18.21; 106/204; 106/214; 252/606; 521/85
[58] Field of Search ............... 106/18.15, 18.17, 18.18, 106/18.21, 204, 214; 54/85, 107; 260/DIG. 24; 252/606

[56] References Cited

U.S. PATENT DOCUMENTS

| | | | |
|---|---|---|---|
| 2,632,742 | 3/1953 | Eckert | 260/17.3 |
| 2,681,326 | 8/1954 | Christianson | 260/39 |
| 2,881,088 | 4/1959 | Schulenburg | 117/33 |
| 2,956,037 | 10/1960 | Venable | 260/30.6 |
| 3,663,267 | 5/1972 | Moran et al. | 260/17.3 |
| 3,697,422 | 10/1972 | Mackie | 252/8.1 |
| 3,733,289 | 5/1973 | Burns et al. | 260/28.5 R |
| 3,955,987 | 5/1976 | Schaar et al. | 106/177 |
| 4,104,073 | 8/1978 | Koide et al. | 106/18.15 |
| 4,198,328 | 4/1980 | Bertelli et al. | 106/18.15 |

FOREIGN PATENT DOCUMENTS 755551 8/1956 United Kingdom .

*Primary Examiner*—Lorenzo B. Hayes
*Attorney, Agent, or Firm*—Connolly and Hutz

[57] ABSTRACT

Ethylene diammonium phosphates are excellent catalysts for particularly those intumescent agents which do otherwise not easily foam when exposed to heat.

9 Claims, No Drawings

NON-INFLAMMABLE FOAMABLE MOLDING COMPOSITIONS

This invention relates to non-inflammable foamable moulding compositions, generally known as "intumescent agents", containing ethylene diammonium phosphate as catalyst.

The term "intumescent agent" is used in this invention to denote substances which are not foamable at temperatures up to 150° C. but foam up at higher temperatures, preferably above 180° C., to form bubbles and produce a multi-cellular flame retardent foam.

Intumescent agents generally consist of
1. a so-called carbonific, i.e. a source of carbon,
2. a "catalyst", as source of boric acid or preferably of phosphoric acid, and
3. a blowing agent as source of non-inflammable gases.

The carbonifics (1) may generally be substances which are capable of providing the carbon structure for the heat insulating foam, e.g. polyhydric alcohols or carbohydrates such as sugar, starch, casein, pentaerythritol and di- and tripentaerythritol. An efficient carbonific should contain a large number of groups capable of esterifying with boric acid or phosphoric acid, preferably hydroxyl groups, and it should contain a high proportion of carbon atoms.

The "catalyst" (2) should as far as possible decompose at a temperature below the decomposition temperature of the carbonific (1) to form a large quantity of boric or phosphoric acid. Ammonium orthophosphate, for example, is suitable for this purpose.

The blowing agent (3) liberates a non-inflammable gas so that foaming takes place and an insulating layer is formed. Decomposition of the blowing agent (3) should occur simultaneously with the decomposition of the boric or phosphoric acid ester formed from the boric or phosphoric acid which has been liberated from the catalyst (2) and the carbonific (1). Examples of preferred blowing agents include guanyl urea, dicyandiamide, dicyandiamidine, allophanate, biuret, melamine and urea.

The action of intumescent paints in the case of fire is possibly as follows:

As soon as the decomposition temperature of the catalyst (2) has been reached, boric or phosphoric acid is liberated, which then partly reacts with the carbonific (1) to form a boric or phosphoric acid ester. As the temperature continues to rise, decomposition of this boric or phosphoric acid ester sets in at a temperature which is usually below the decomposition temperature of the unesterified carbonific (1). The decomposition products consist mainly of carbon, water, oxides of carbon and boric or phosphoric acid, which in turn may react with the unesterified carbonific (1).

At the same time that the boric or phosphoric acid ester undergoes decomposition, the blowing agent begins to decompose to deliver non-inflammable gases which expand the carbon-containing residue of the boric or phosphoric acid ester to form a foam which acts as an insulating layer. By using at least two different blowing agents having different decomposition temperatures, it is possible to prolong the evolution of gas so that a larger quantity of foam can be produced.

Intumescent agents are known; see e.g. British Pat. No. 755,551; French Pat. No. 2,376,092; U.S. Pat. Nos. 2,632,742; 3,681,326; 2,881,088; 2,956,037; 3,663,267; 3,697,422; 3,733,289 and 3,955,987 and German Offenlegungsschrift No. 2,704,897. These are generally made up into protective lacquers used on wood or metal.

When exposed to heat, intumescent agents melt with evolution of gas and on reaching a sufficiently low viscosity they change into a "carbonized" foam system, i.e. one which is very rich in carbon content and relatively non-inflammable. This foam only burns very slowly and protects the underlying surface by its insulating effect.

When suitably modified, intumescent agents are suitable not only for the formation of thin lacquer layers but also for use as thicker layers, e.g. as putty, and their capacity to foam up, which normally comes into effect only in the event of fire, may also advantageously be utilized for the manufacture of foamed moulded products, e.g. by heating granulates of such putty compounds (optionally in the dry state) in moulds.

The intumescent agents which are the object of this invention are required to have substantially the following properties:
1. An intumescent agent satisfying the more recent technical requirements should be substantially free from halogen, i.e. it should be free from or contain only a very small quantity of halogen carriers such as halogen-containing plasticizers or binders, since in the event of fire halogen compounds are liable to form phosgene and produce considerable damage by corrosion.
2. They should have the capacity to foam vigorously in the heat, and this should be relatively independent of the carbonific used.
3. They should be unaffected by high relative humidities in the atmosphere.

Starch and in particular cellulose are polysaccharides which do not readily foam, if at all, in combination with the usual catalysts and blowing agents. As solid substances, they belong to the class of carbonifics which generally require an additional binder to hold the individual components of the intumescent agent together. However, it has been shown in the past that virtually all organic binders inhibit the foaming of intumescent agents based on carbohydrates.

It has now surprisingly been found that the requirements listed above can be satisfactorily fulfilled by intumescent agents containing ethylene diammonium phosphates as catalysts.

The term "ethylene diammonium phosphates" is used in the context of this invention to denote reaction products of ethylene diamine and phosphoric acids such as, for example, meta, ortho, pyro and polyphosphoric acid; those ethylene diammonium phosphates are preferred whose aqueous solutions (concentration 1% by weight) have a pH of at least 6.5, preferably from 7 to 8, determined at room temperature, because acid corrosion can then be prevented. Among the various phosphoric acids, orthophosphoric acid is preferred because of its ease of handling.

The present invention thus provides non-inflammable foamable moulding compositions based on intumescent agents consisting of
(1) at least one carbonific,
(2) at least one catalyst,
(3) at least one blowing agent, and optionally fillers, preservatives, dyes and other auxiliary agents, characterized in that ethylene diammonium phosphates are used as the catalyst (2).

The carbonific and blowing agent may optionally coincide and the catalyst may also take over the function of blowing agent.

The invention also provides a method for the preparation of the moulding compositions defined above, characterized in that the individual components are mixed together in known manner.

The substances used as carbonifics (1) may be any of the usual substances such as formaldehyde resins, paraformaldehyde, pentaerythritol, mannitol, other aldoses or ketoses and lower sugars, e.g. cane sugar, optionally in admixture with other carbon sources (1) as well as non-crystallizing sugar-like compounds usually in the form of mixtures, in particular formoses and/or their esters, e.g. their acetates, propionates, formates or benzoates, or their aqueous solutions.

The preferred non-crystallizing sugar-like substances include honey, molasses, other syrups obtained by boiling or extraction of vegetable substrates containing sugar, and sugar syrups prepared by fermentation (e.g. from starch).

Non-crystallizing sugar-like substances may also be obtained by converting compounds which tend to crystallize into non-crystallizing products by heating, optionally with the addition of water and/or other additives, e.g. phosphates.

The use of formoses and/or formose esters as carbonifics (1) is also of interest. Formoses are sugar-like substance mixtures, in most cases slightly hygroscopic, which may be obtained by the polycondensation of formaldehyde, usually in the presence of basic catalysts.

According to a preferred embodiment of the invention, the use of coalescing (i.e. hygroscopic) substances, e.g. low molecular weight alcohols such as trimethylol propane, saccharose, fructose or sorbitol as carbonifics (1) is dispensed with. The intumescent agents obtained in such cases will not coalesce, effloresce or bleed even at relative atmospheric humidities of over 90%. These preferred carbonifics (1) include in particular starch, cellulose and other naturally occurring high molecular weight polysaccharides such as pullulan or chitin-like substances, pentaerythritol, mannitol and dextrine.

The starches and celluloses used for the purpose of the invention may also be ground or shredded, naturally occurring or manufactured substances containing these constituents, e.g. grain flour, milled or shredded plants or parts of plants, such as grass, leaves, wood, fruit kernels, cellulose, wood shavings, wood meal or cotton. Pulverulent substrates are particularly suitable although fibrous materials such as paper waste or sawdust may also be used.

The ethylene diammonium phosphate catalysts (2) may be used in an isolated form, e.g. as powders or aqueous solutions, but one particular method is recommended in which the ethylene diammonium phosphates are prepared from their components in situ by a simple neutralization reaction in the presence of the carbonific (1), blowing agent (3) and optionally fillers. The neutral point can easily be determined by titration.

Suitable blowing agents (3) include ammonium carbonate, ammonium carbaminate, ammonium formate, other ammonium salts or urea, biuret or guanidine, and in particular dicyandiamide.

It was found that when ethylene diammonium phosphates were used, a carbonific based on a carbohydrate or the like could be dispensed with and other binders would be used instead or in addition to serve as carbonifics, e.g. latices or solutions or diluent-free preparations of vinyl polymers such as polyvinyl acetate or polyvinyl chloride, polyacrylates, styrene polymers, diene and olefin polymers, binders based on polyesters, phenol resins, urea resins, melamine resins or epoxide resins (e.g. based on reaction products of epichlorohydrin and 4,4'-dihydroxy-diphenyl propane) or based on alkyd resins, of the type used as lacquer binders. An isocyanate resin such as may be obtained by the reaction of, in particular, aromatic polyisocyanates with water, polyhydric alcohols or polyamines may also be used as binder. This is particularly interesting because intumescent agents capable of being hardened by water (or atmospheric moisture) are thereby made available from binders based e.g. on aromatic polyisocyanates, and it is unexpectedly found that the ethylene diammonium phosphate content of such intumescent agents does not accelerate the hardening reaction to an intolerable level nor does it prevent the formation of intumescent agents which have a sufficiently long dry storage time and begin to harden on access to moisture.

The carbonifics (1) may be commercially readily available polyisocyanates, e.g. fractions obtained from the commercial production of diphenyl methane diisocyanate and/or polyurethanes or polyureas containing isocyanate groups. When such carbonifics are used, an additional blowing agent (e.g. dicyandiamide) may in most cases be dispensed with because either the carbonific (1) or the catalyst (2) takes over the function of blowing agent. The patent claims therefore also cover moulding compositions consisting substantially of carbonific (1) and catalyst (2) in which (1) and/or (2) exist as a masked blowing agent and may take over the function of blowing agent.

According to a particularly preferred embodiment of the invention, products having a spherical or near spherical structure are used as fillers, in particular hollow beads.

Although inorganic spherical fillers are preferred on account of their non-inflammability, spherical or hollow spherical fillers consisting of organic material may also be used, e.g. cross-linked or non-cross-linked polystyrene or polyethylene, phenol resin or polyvinyl chloride. The material from which the spherical particles are made should be insoluble in water.

Pellets of quartz or silicate, glass pellets, pellets of flue dust and above all pellets of aluminosilicates should be particularly mentioned. Solid and hollow pellets of these substances are readily available. The size of these particles may be up to 800 microns and is preferably from 5 to 500 microns.

The spherical particles of filler may be used in combination with non-spherical fillers or with organic or inorganic fibres but they are preferably used alone.

The spherical or near spherical fillers may be used in quantities of from 1 to 80% by weight, preferably from 20 to 70% by weight, based on the moulding composition according to the invention.

Although the addition of other fillers such as glass, carbon or mineral fibres, chalk, stone powder, talcum, perlite, vermiculite, asbestos, kaolin, silica, clay, carbon, magnesium oxide, aluminium oxides and iron oxides reduces foaming, their use should certainly be considered wherever less intensive foaming is acceptable.

If the intumescent agents free from fillers and auxiliary agents are used as anhydrous substances, they generally contain the individual components in the following proportions (1) to (3):

(1) carbonific: 0.1 to 80, preferably 3.5 to 70 parts by weight
(2) catalyst: 5 to 70, preferably 15 to 50 parts by weight
(3) blowing agent: 5 to 70, preferably 15 to 50 parts by weight.

The moulding compositions according to the invention are preferably bound with the aqueous solution of one of the components. The consistency may therefore easily be altered by altering the water content. It may vary from hard to plastic or soft so that the moulding compositions may be applied by any of the known methods, i.e. by hot or cold moulding (e.g. at 5° to 150° C.), by extrusion, e.g. for the manufacture of sections of tubes filled with intumescent agent, by masonry methods or by means of putty guns or by application with brush, roller or sprayer.

Organic binders may also be used, e.g. Vaselone, saturated and/or unsaturated polyester resins having a liquid to viscous character, e.g. those based on phthalic acid, adipic acid, maleic acid, fumaric acid and ethylene glycol, propylene glycol, glycerol or trimethylol propane, polyvinyl acetate dispersions, ethylene/vinyl acetate copolymers or, if the presence of halogen is permissible, also PVC pastes containing plasticizers.

Moulded products which foam up at elevated temperatures, e.g. above 200° C., and so prevent the spreading of fire may be manufactured from the moulding compositions according to the invention, e.g. by moulding or casting and gelling by heat or drying. These products are suitable as sealing elements, safety devices and fire barriers. The products may also be used for filling joints and closing cable breaks. For this purpose, a type of concrete may be prepared from a slurry of the intumescent agent and stones and/or expanded particles such as expanded clay, expanded glass, perlite or the like, and/or beads of foam e.g. based on polystyrene, and used for this purpose.

Coatings of any thickness, with or without reinforcement, may also be applied to metal, e.g. to steel supports and plates, or to wood, e.g. in the form of door panels or roof beams, or to brickwork or plastics products such as cable insulations or foam panels. Fire-retarding panels or wall elements can easily be obtained by applying such a coating to a portable panel or supporting construction, e.g. in or on a panel of stretched metal or a honeycomb panel of metal, cardboard, paper, wood, ceramic or plastics. These coatings may also be applied to the inside of fire-retardant doors, where they foam up in the event of fire to act as an insulating layer, or they may be applied to gaps in doors or similar structures, where they foam up in the event of fire to seal off the gap. Fire-proof seals may also be obtained by filling or back filling sealing profiles, e.g. of elastic material, with moist or dry moulding compositions according to the invention. The materials may also be suitably arranged in chimneys, ventilation and air conditioning plants, pipes and inlet and outlet apertures to build up barriers which will retard or prevent the passage of gases when heated to about 250° C. The arrangements may consist, for example, of stacks or parallel plates arranged close together, sieves and perforated partitions coated with the moulding compositions, or tube sections loosely filled with granulates of the moulding compositions.

The foams may be produced from the moulding compositions in the moist state or preferably in as dry a state as possible.

Moulded articles which can easily be manufactured by hot or cold moulding the composition, or granules of various particle sizes, for example, may be foamed up in one or more stages by heating them to temperatures above 180°–250° C., preferably to temperatures of from 250°–1,800° C., in particular temperatures from 250°–800° C. Foaming may be unrestricted or carried out in closed or open moulds which should have apertures for the escape of vapour and air.

Heating may be by radiant heat, by treatment with hot steam or air or other hot gases, by microwave or high frequency heating or by thermal conduction in air or liquid baths or metal baths.

The moulding compositions according to the invention may also be applied to carrier materials to be foamed up there; e.g. expanded clay particles may be coated with the compositions and then poured into a mould to be heated so that a block of expanded clay embedded in carbonization foam is obtained. A suitably coated panel of wood or iron may be worked up into a foam combination panel at 250° C. and the foam surface of this panel may be covered by an additional wood or iron panel.

Cavities in brick or other building material may also be filled up by foaming the moulding compositions, e.g. by introducing suitable quantities of the moist or granulated moulding compositions into the stonework while it is still hot or cold.

Since the filler content of the moulding compositions according to the invention imparts a considerable resistance to oxidation and heat to the resulting foams, the foams are suitable for the manufacture of half-shells or complete jackets for the high temperature insulation of pipes. It should also be noted that the insulation may be carried out in situ by coating the pipe or other article with the moulding compositions and causing this to foam up either by heating the article from the inside outwards or from the outside, e.g. by hot air or by means of a blow torch.

The unit weights of the foams range from approximately 900 to approximately 10 kg/m$^3$, preferably from 50 to 500 kg/m$^3$. In a given formulation, they depend on the temperature to which the foams are heated and the intensity of heating. The unit weight obtained at 200° or 250° C., for example, is higher than that obtained at 350° or 500° C., although a higher unit weight is obtained by slow heating, e.g. to 500° C., than by direct contact with a flame.

The parts and percentages given in the following Examples refer to weight unless otherwise indicated.

EXAMPLES

Description and experimental technique:

The individual components which were to be pulverized were milled for 10 hours in a porcelain ball mill. The pulverulent components were then mixed with the liquid components at room temperature in a 500 ml laboratory kneader and kneaded for 15 minutes. The consistency of the kneaded mixture was in most cases adjusted by the addition of the liquid component or of water.

To test the behaviour of the kneaded material under heat, 2 grams thereof were formed into a ball and dried in a drying cupboard.

Foaming was tested on dried samples by introducing the samples into a cabinet heated to 260° C. These samples were also exposed to the natural gas flame of a bunsen burner.

Foaming was assessed as follows:

|  |  | Index |
| --- | --- | --- |
| up to doubling of volume | moderate | (3) |
| up to trebling of volume | good | (2) |
| more than trebling of volume | very good | (1) |

To test the behaviour of the compound under conditions of moist storage, the sample material was made up into cubes 2 cm in length and placed on a petri dish. The dish was introduced into a container in the form of a bucket which could be closed by a lid and the bottom of which was covered with water to a height of about 5 cm. The petri dish was about 10 cm above the surface of the water. The bucket was then sealed and left to stand for 10 days at 25° C. The appearance of the cube was assessed at the end of this time.

|  |  | Index |
| --- | --- | --- |
| Cube collapsed with loss of shape | poor | (5) |
| formation of secretion but cube stands | poor | (4) |
| cube considerably softened, no secretion | moderate | (3) |
| cube stable | good | (2) |

Phosphates were prepared by neutralization of the amines with orthophosphoric acid in an aqueous medium, drying and milling. The components were then again milled together in a ball mill.

Moist storage was carried out in the apparatus described, and the weight increase was determined after 4 days.

Composition of mixture:
1 part corn starch
1 part dicyandiamide
1 part phosphate

|  | Weight increase % |
| --- | --- |
| Phosphate of |  |
| primary ammonium phosphate | 7 |
| secondary ammonium phosphate | 10 |
| ethylene diamine commercial | 3 |
| diethylene triamine commercial | 20 |
| triethylene tetramine commercial | 15 |
| tetraethylene pentamine commercial | 23 |
| pentaethylene hexamine commercial | 17 |

EXAMPLE 1

The above survey shows the surprisingly favourable response of ethylene diammonium phosphate to moist storage. The following comparison of the catalytic activity of this salt with that of primary ammonium phosphate clearly shows the unexpected superiority of ethylene diammonium phosphate.

Equal parts of 20% starch, 20% dicyandiamide and 20% phosphate were vigorously mixed with 40% of hollow silicate beads and kneaded with 10% of starch paste to make a putty.

| Assessment of test samples: | | |
| --- | --- | --- |
|  | Primary ammonium phosphate | Ethylene diammonium phosphate |
| Flame | 2 | 1 |

-continued

| Assessment of test samples: | | |
| --- | --- | --- |
|  | Primary ammonium phosphate | Ethylene diammonium phosphate |
| 250° C. | 3 | 1 |

EXAMPLE 2

10 parts of commercial ethylene diamine were reacted with 18.9 parts of commercial 85% orthophosphoric acid. A 1% aqueous solution of the resulting salt had a pH of 7. The powdered salt was kneaded together with 30 parts of potato starch, 20 parts of dicyandiamide and 23 parts of water to form a putty. In the moist storage test it was given the assessment 2. Weight control showed no increase in weight in a moist atmosphere.

When an equal quantity by weight of primary ammonium phosphate was used instead of ethylene diammonium phosphate, the assessment in moist storage was 3, and when ethylene diammonium phosphate was replaced by neutral triethylene tetrammonium orthophosphate, the assessment was only 4.

Replacement of dicyandiamide by urea also worsened the results of moist storage by 1 index point.
Assessment of flame: 1
Assessment at 250° C.: 1

EXAMPLE 3

This example is provided to demonstrate that ethylene diammonium phosphate also provides very good results in non-aqueous formulations.

Sufficient $H_3PO_4$ was added to ethylene diamine to produce a salt mixture which had a pH of 7 to 7.5 in an aqueous medium. The phosphate was then dried and 10 parts of this salt were finely milled in a ball mill with 10 parts of starch and 10 parts of dicyandiamide. The powder obtained was then mixed to a putty with commercial Vaseline (about 10 parts). A mark of 2 was obtained for the moist storage assessment of the putty on the scale indicated above.

Foaming behaviour at 250° C.: 1
Flame: 1 (no burning when flame removed)

When a copolymer of ethylene and about 45% vinyl acetate (molecular weight approximately 2,000) was used instead of Vaseline, the following results were obtained:

Moist storage: 2
Foaming at 250° C.: 2
Flame: 2

EXAMPLE 4

The following were introduced into a kneader: 5 parts of ethylene diamine, 15 parts of starch (corn), 10 parts of dicyandiamide. A pulverulent mixture was obtained.

9.45 parts of 85% orthophosphoric acid were then introduced in the course of 15 minutes. A pulverulent mixture was obtained on heating. When introduced into water after about 15 minutes kneading and mixing, it was found to have a pH of 7.

5 parts of this mixture were mixed to a putty with 2.3 parts of Desmophen 800 ®, a liquid polyester product of Bayer AG. The following assessment was obtained for this putty:

Moist storage: 2
Foaming 250° C.: 1

Flame: 1

EXAMPLE 5

(a) Same as Example 4 but mixing with about 1.6 parts of water to form a putty. The foaming test provides the same result.
(b) The same as Example 4 but mixing to a putty with 2.3 parts of Lekutherm X 80 ®, an aromatic epoxide resin of Bayer AG. The same assessment was obtained in the foaming test.

EXAMPLE 6

When 5 parts of the mixture of Example 4 were kneaded, first with 1 part of Vaseline and then with 1.6 parts of water, the putty obtained has excellent working up properties and the assessment is similar.

EXAMPLE 7

30 parts of commercial superfine wheat flour were mixed with 20 parts of ethylene diamine and then with 18.9 parts of 85% $H_3PO_4$ and 30 parts of hollow silicate beads (Fillite 52/75 ®, Fillite Ltd.). 5 parts of the resulting pulverulent product were then made up into a putty with 10% of aqueous starch paste (5 parts).
The following assessment was obtained:
Moist storage: 2
Flame: 1
250° C.: 1

EXAMPLE 8

Same as Example 7 but using wood meal instead of wheat flour:
Moist storage: 2
Flame: 1
250° C.: 2

EXAMPLE 9

Same as Example 7 but using cellulose powder (type 123, Schleicher & Schüll) instead of hollow silicate beads:
Moist storage: 2
Flame: 1
250° C.: 2

EXAMPLE 10

Same as Example 7 but using a mixture of equal parts of starch and wood pulp instead of wheat flour:
Moist storage: 2
Flame: 2
250° C.: 2

The manufacture of moulded bodies and foams from the moulding compositions according to the invention is described below by way of example, using the mixture described in Example 7, but all other mixtures described by way of example may in principle be used in analogous manner.

EXAMPLE 11

The putty-like mass described in Example 7 was dried at 75° C. and granulated. The granulate having an average grain diameter of about 5 mm was scattered over a woodchip board and moulded on the board, using the force of a platen press heated to 180° C. A homogeneous coating of the intumescent mass was obtained on the surface of the board. When exposed to a flame, the coating foamed up and protected the material underneath it.

EXAMPLE 12

The granulate (Example 11) was preheated to 100° C. and moulded into boards on a platen press at 180° C. When hot (about 120° C.), these boards could be thermoplastically deformed, e.g. into half shells of pipes. These half shells, which were produced from the granulate in a suitable mould by a process similar to that used for the flat products, can be used to sheath ducts to protect them against fire. When exposed to a flame, they foam up and protect the material underneath them.

EXAMPLE 13

The putty (Example 7) was extruded to form a pipe having a diameter of 2 cm and a wall thickness of 0.5 cm, using an extruder at 95° C. The pipe was cooled with air and dried. Sections of such pipes are used for passing cables through fire sections, and they seal by foaming up when the temperature rises above 260° C.

EXAMPLE 14

A plywood panel about 5 mm in thickness was perforated with apertures 5 mm in diameter spaced about 1.5 cm apart to form a regular perforated board. The board was then coated on both sides with a layer of the putty of Example 7, 8 mm in thickness, by application with a coating knife or trowel and dried. Such boards are used as fire-resistant panels, e.g. in the construction of doors. The coating foams up when heated above 250° C. and protects the material underneath it by insulation. Steel supports are similarly protected when treated with the composition according to Example 7.

EXAMPLE 15

The granulate according to Example 11 was loosely packed into a cylindrical steel mould (diameter 6 cm, height 20 cm) so that the mould was approximately half filled. The mould was then heated in a hot air oven at 280° C. and cooled after 15 minutes. A cylinder of foam was obtained. The original boundaries between the granules had merged by foaming so that the foam had a substantially homogeneous structure. The cylinder was tempered for 30 minutes at 400° C. under nitrogen. Both the tempered and the untempered foam sample (unit weight about 150 kg/m$^3$) may be used as starting material for the manufacture of half shells for insulating pipes at temperatures above 300° C.

EXAMPLE 16

A board according to Example 12 and about 5 mm in thickness was heated in a commercial microwave oven. It foamed up to form a foam panel having a unit weight of about 200 kg/m$^3$.

EXAMPLE 17

An iron pipe (diameter 3 cm) was coated on the outside with a layer of about 3 mm of the putty composition according to Example 7 at 50° C. After drying at 120° C., the pipe was introduced into a hot air oven which was at an air temperature of about 300° C. The coating foamed up in the oven to form an insulating sheath round the pipe. An insulating sheath is also obtained by passing hot air or a liquid heating medium at 250° to 350° C. through the coated pipe. The insulating layer obtained had a thickness of approximately 10 mm.

EXAMPLE 18

This example is to demonstrate that an isocyanate binder may be used as carbonific instead of a carbohydrate.

30 parts of hollow silicate beads according to Example 7 were mixed with 15 parts of ethylene diammonium phosphate powder which had been prepared by the reaction of 20 parts of ethylene diamine with 18.9 parts of commercial 85% phosphoric acid followed by drying at 150° C. and milling in a ball mill.

This mixture was made up into a putty-like consistency by mixing with about 20 parts of Desmodur 44 V 40®, an aromatic polyisocyanate fraction of Bayer AG, under conditions preventing the access of atmospheric moisture.

The putty was still smoothly workable after 2 days storage with exclusion of air at about 60° C. When atmospheric moisture was admitted, it hardened within a few days whereever it had been applied. In cases where it had been mixed with about 10% of water before it was applied, it hardened overnight.

A board of the hardened substance 5 mm in thickness was subjected to the flame of a bunsen burner on one side. It expanded to form a fire retardant foam about 1.5 cm in thickness.

The assessment under conditions of moist storage was 2 and the assessment for foaming up in the flame was also 2.

I claim:

1. In non-inflammable foamable, intumescent moulding compositions comprising
   (1) at least one carbonific,
   (2) at least one catalyst,
   (3) at least one blowing agent, and
   (4) at least one filler
   (5) the improvement consisting of ethylene diammonium phosphate as the catalyst (2) and hollow silicate beads as the filler (4), said beads being present in an amount of from 1 to 80% by weight, based on the moulding composition.

2. Moulding compositions according to claim 1, wherein the carbonific (1) is starch cellulose or mixtures thereof.

3. Moulding compositions according to claim 1, wherein the blowing agent (3) is dicyandiamide.

4. Moulding compositions according to claim 1, wherein the catalyst (2) is the reaction product of ethylene diamine and orthophosphoric acid.

5. Moulding compositions according to claim 1, wherein the catalyst (2) has a pH of from 6.5 to 8 in aqueous solution having a concentration of 1% by weight.

6. Moulding compositions according to claim 1, containing components (1) to (3) in the following proportions:
   0.1 to 80 parts by weight of (1),
   5 to 70 parts by weight of (2) and
   5 to 70 parts by weight of (3).

7. Moulding compositions according to claim 1, containing components (1) to (3) in the following proportions:
   3.5 to 70 parts by weight of (1),
   15 to 50 parts by weight of (2) and
   15 to 50 parts by weight of (3).

8. Moulding compositions according to claim 1, consisting of an isocyanate resin as the carbonific (1).

9. The coatings, putties, foams and shaped products produced from the molding compositions of claim 1.

* * * * *